United States Patent
Van Orden

[11] 3,731,990
[45] May 8, 1973

[54] SYMMETRICAL COPY LENSES

[75] Inventor: Lynn L. Van Orden, Holley, N.Y.

[73] Assignee: Bausch & Lomb Incorporated, Rochester, N.Y.

[22] Filed: Oct. 28, 1971

[21] Appl. No.: 193,289

[52] U.S. Cl..................................350/221, 350/202
[51] Int. Cl..........................G02b 9/36, G02b 17/08
[58] Field of Search............................350/221, 202

[56] References Cited

UNITED STATES PATENTS

| | | | |
|---|---|---|---|
| 2,865,252 | 12/1958 | Reiss | 350/221 |
| 3,370,904 | 2/1968 | Hudson | 350/221 |
| 3,402,003 | 9/1968 | McFarland | 350/202 UX |

*Primary Examiner*—John K. Corbin
*Attorney*—Frank C. Parker et al.

[57] ABSTRACT

A series of four element photographic lenses for use at or near unity magnification, the lenses being in the form either of four elements in a symmetrical pattern or two elements and a mirror.

16 Claims, 2 Drawing Figures

SYMMETRICAL COPY LENSES

BACKGROUND OF THE INVENTION

1. Field of the Invention

This invention lies in the field of symmetrical four component lenses of the kind having singlet positive meniscus lenses in the first and fourth positions and singlet negative meniscus lenses in the second and third positions, all such meniscus lenses being concave toward a central aperture stop.

2. Description of the Prior Art

Lenses of the shapes here in question are shown in U.S. Pat. Nos. 3,449,040 and 3,507,560. Such lenses are often employed in copy devices for use at or near unit magnification in which case they may consist either of four lenses of which the first and fourth lenses and the second and third lenses are respectively identical but reversed, or they may consist of only a first and second lens with a mirror aligned in the central aperture stop so that an off axis ray proceeding through the first and second lens to the mirror will be reflected back through the second and the first lenses in the same way as if it were passing through the third and fourth lenses. Accordingly, with such symmetrical lenses a complete description is given merely by the radii, respectively, of the first and second lenses, the thicknesses, respectively, of the first and second lenses, the spaces separating the first lens from the second and the second lens from the stop and the respective glass types.

SUMMARY OF THE INVENTION

I have discovered within the field of symmetrical, four single element lenses of the above description a pattern of lens shapes, thicknesses, spaces and glass types which is richly productive of lenses characterized by good image resolution and freedom from aberrations at relatively high apertures.

DESCRIPTION OF THE PREFERRED EMBODIMENTS

Figure 1:
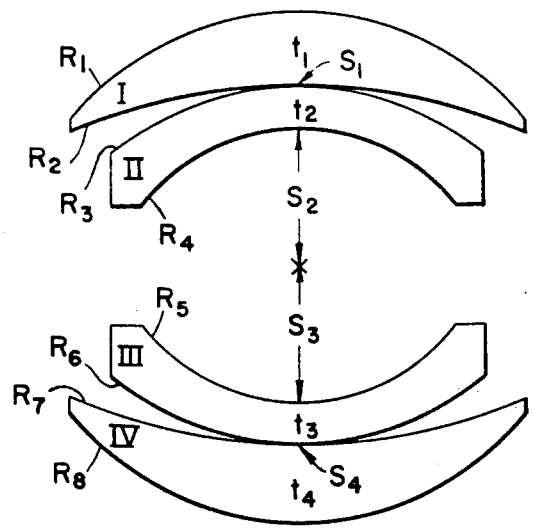
FIG. 1 is a optical schematic of the lens of my invention.

As may be seen from FIG. 1 the lens of my invention consists of four elements all of which are meniscus lenses concave toward a central stop and being designated respectively I–IV of which it may be seen that lenses I and IV are of identical shape but reversed, and lenses II and III are likewise of identical shape but reversed. Lenses I and IV are both positive singlet meniscus lenses of relatively low index, high dispersion glass while lenses II and III are negative singlet meniscus lenses of relatively high index glass and relatively low dispersion. Lens I is defined by radii $R_1$ and $R_2$ and a thickness $t_1$, these parameters being identical respectively to the radii $R_7$ and $R_8$ and the thickness $t_4$ of the lens IV. Lens II is defined by radii $R_3$ and $R_4$ and the thickness $t_2$ which correspond respectively to the radii $R_5$ and $R_6$ and the thickness $t_3$ of the lens III. The lenses I and IV and the lenses II and II, respectively, are made from glasses of the same refractive indices, $n_{D1}$ and $n_{D2}$ as well as of the same Abbe numbers $\nu_1$ and $\nu_2$, describing the relative dispersions. In addition, the lens II is airspaced very narrowly from the Lens I, which space is designated $S_1$. The space $S_1$ is of identical magnitude with the space designated $S_4$ by which the lens IV is airspaced narrowly from the lens III, and the lenses II and III are spaced from a central aperture stop by spaces $S_2$ and $S_3$, respectively, which are equal to one another.

Figure 2:
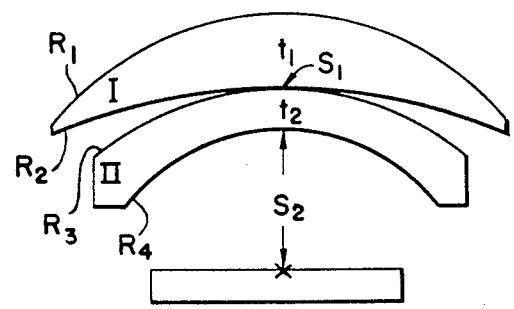
FIG. 2 is an optical schematic of a version of the lens of my invention wherein a mirror is replacing the second half of the lens.

As noted above, because of the symmetry of the kind of lenses here described the lenses III and IV can, for certain purposes and in certain applications, be replaced by a mirror in the position of the aperture stop as is shown in FIG. 2. Therefore a lens of the kind here in question is completely described by enumeration of the first four radii $R_1$ through $R_4$, the first two thicknesses $t_1$ and $t_2$, the first two spaces $S_1$ and $S_2$, the refractive indices $n_{D1}$ and $n_{D2}$ of the first two lenses and the Abbe number $\nu_1$ and $\nu_2$ of the first two lenses. Accordingly, I have found that symmetrical lenses of the type here disclosed constructed in accordance with the parameters set forth in Table I below produce images of high quality, good image resolution, maximum freedom from aberrations and good contrast. The radii, thicknesses and spaces are disclosed as decimal ratios of the focal length. The refractive indices $n_D$ and the Abbe numbers $\nu$ are given directly.

TABLE I

|          | 1      | 2      | 3      | 4      | 5      | 6      |
|----------|--------|--------|--------|--------|--------|--------|
| $R_1$    | .217   | .217   | .208   | .211   | .211   | .211   |
| $R_2$    | .435   | .439   | .416   | .424   | .424   | .424   |
| $R_3$    | .207   | .213   | .203   | 2.04   | .203   | .204   |
| $R_4$    | .147   | .148   | .143   | .143   | .143   | .143   |
| $t_1$    | .048   | .051   | .045   | .046   | .045   | .046   |
| $t_2$    | .030   | .028   | .028   | .029   | .029   | .029   |
| $S_1$    | .0004  | .0004  | .0005  | .0005  | .0005  | .0005  |
| $S_2$    | .095   | .093   | .093   | .092   | .093   | .093   |
| $n_{D1}$ | 1.620  | 1.620  | 1.620  | 1.620  | 1.620  | 1.620  |
| $n_{D2}$ | 1.720  | 1.673  | 1.720  | 1.720  | 1.720  | 1.720  |
| $\nu_1$  | 60.3   | 60.3   | 60.3   | 60.3   | 60.3   | 60.3   |
| $\nu_2$  | 29.3   | 32.2   | 29.3   | 29.3   | 29.3   | 29.3   |

The six lenses specified in the table above give outstanding performance at apertures as large as $f/4.5$. If in the manufacture of the individual lenses and their mounting components certain variations in any of the numbers listed were to occur, an optical technician of ordinary skill would nonetheless be able to assemble a substantially symmetrical lens from such varied components. If such variations were within certain ranges, the performance of the lens so assembled would still meet certain commercial standards and be useful for their intended purpose, although perhaps at smaller apertures, as for example $f/16$ or $f/22$. If all variations in characteristics were kept within the ranges given below in Table II, useful lenses may be assembled from the components.

TABLE II

| | | | | |
|---|---|---|---|---|
| .207f   | ≤ | $R_1$    | ≤ | .217f  |
| .415f   | ≤ | $R_2$    | ≤ | .445f  |
| 1.98f   | ≤ | $R_3$    | ≤ | .215f  |
| .140f   | ≤ | $R_4$    | ≤ | .149f  |
| .044f   | ≤ | $t_1$    | ≤ | .052f  |
| .027f   | ≤ | $t_2$    | ≤ | .031f  |
| .0004f  | ≤ | $S_1$    | ≤ | .0006f |
| .090f   | ≤ | $S_2$    | ≤ | .096f  |
| 1.615   | ≤ | $n_{D1}$ | ≤ | 1.625  |
| 1.673   | ≤ | $n_{D2}$ | ≤ | 1.721  |
| 57.8    | ≤ | $\nu_1$  | ≤ | 62.8   |
| 27.8    | ≤ | $\nu_2$  | ≤ | 33.0   |

I claim:

1. A symmetrical lens having four singlet meniscus elements symmetrical about and concave toward a central stop, the first and second elements having radii, proceeding toward the center, $R_1$, $R_2$, $R_3$, and $R_4$, and thicknesses, proceeding toward said center, $t_1$ and $t_2$, said lenses being spaced apart by a space $S_1$ and said second lens being spaced from said center by a space $S_2$, said radii, thicknesses, and spaces being expressed as a fraction of the focal length $f$ falling within the ranges listed below and said elements being of glass having characteristic refractive indices $n_{D1}$ and $n_{D2}$ and Abbe numbers $v_1$ and $v_2$ falling within the ranges listed in the table below:

| | | | | |
|---|---|---|---|---|
| .207f | ≤ | $R_1$ | ≤ | .217f |
| .415f | ≤ | $R_2$ | ≤ | .445f |
| .198f | ≤ | $R_3$ | ≤ | .215f |
| .140f | ≤ | $R_4$ | ≤ | 1.49f |
| .044f | ≤ | $t_1$ | ≤ | .052f |
| .027f | ≤ | $t_2$ | ≤ | .031f |
| .0004f | ≤ | $S_1$ | ≤ | .0006f |
| .090f | ≤ | $S_2$ | ≤ | 0.96f |
| 1.615 | ≤ | $n_{D1}$ | ≤ | 1.625 |
| 1.673 | ≤ | $n_{D2}$ | ≤ | 1.721 |
| 57.8 | ≤ | $v_1$ | ≤ | 62.8 |
| 27.8 | ≤ | $v_2$ | ≤ | 33.0 |

2. The lens of claim 1 having values substantially as listed below:

| | |
|---|---|
| $R_1$ | .217f |
| $R_2$ | .435f |
| $R_3$ | .207f |
| $R_4$ | .147f |
| $t_1$ | .048f |
| $t_2$ | .030f |
| $S_1$ | .0004f |
| $S_2$ | .095f |
| $n_{D1}$ | 1.620 |
| $n_{D2}$ | 1.720 |
| $v_1$ | 60.3 |
| $v_2$ | 29.3 |

3. The lens of claim 1 having values substantially as listed below:

| | |
|---|---|
| $R_1$ | .217f |
| $R_2$ | .439f |
| $R_3$ | .213f |
| $R_4$ | .148f |
| $t_1$ | .051f |
| $t_2$ | .028f |
| $S_1$ | .0004f |
| $S_2$ | .093f |
| $n_{D1}$ | 1.620 |
| $n_{D2}$ | 1.673 |
| $v_1$ | 60.3 |
| $v_2$ | 32.2 |

4. The lens of claim 1 having values substantially as listed below:

| | |
|---|---|
| $R_1$ | .208f |
| $R_2$ | .416f |
| $R_3$ | .203f |
| $R_4$ | .143f |
| $t_1$ | .045f |
| $t_2$ | .028f |
| $S_1$ | .0005f |
| $S_2$ | .093f |
| $n_{D1}$ | 1.620 |
| $n_{D2}$ | 1.720 |
| $v_1$ | 60.3 |
| $v_2$ | 29.3 |

5. The lens of claim 1 having values substantially as listed below:

| | |
|---|---|
| $R_1$ | .211f |
| $R_2$ | .424f |
| $R_3$ | .204f |
| $R_4$ | .143f |
| $t_1$ | .046f |
| $t_2$ | .029f |
| $S_1$ | .0005f |
| $S_2$ | .092f |
| $n_{D1}$ | 1.620 |
| $n_{D2}$ | 1.720 |
| $v_1$ | 60.3 |
| $v_2$ | 29.3 |

6. The lens of claim 1 having values substantially as listed below:

| | |
|---|---|
| $R_1$ | .211f |
| $R_2$ | .424f |
| $R_3$ | .203f |
| $R_4$ | .143f |
| $t_1$ | .045f |
| $t_2$ | .029f |
| $S_1$ | .0005f |
| $S_2$ | .093f |
| $n_{D1}$ | 1.620 |
| $n_{D2}$ | 1.720 |
| $v_1$ | 60.3 |
| $v_2$ | 29.3 |

7. The lens of claim 1 having values substantially as listed below:

| | |
|---|---|
| $R_1$ | .211f |
| $R_2$ | .424f |
| $R_3$ | .204f |
| $R_4$ | .143f |
| $t_1$ | .046f |
| $t_2$ | .029f |
| $S_1$ | .0005f |
| $S_2$ | .093f |
| $n_{D1}$ | 1.620 |
| $n_{D2}$ | 1.720 |
| $v_1$ | 60.3 |
| $v_2$ | 29.3 |

8. A retroreflective lens for use at or near unit magnification having first and second singlet meniscus elements and a plano mirror, said elements being concave toward said mirror and having radii, proceeding toward said mirror, $R_1$, $R_2$, $R_3$, $R_4$, and thicknesses, proceeding toward said mirror, $t_1$ and $t_2$, said first element being separated from said second element by a space $S_1$, and said second element being separated from said mirror by a space $S_2$, said radii, thicknesses and spaces being expressed as a fraction of the focal length $f$, falling within the ranges listed below, and said elements being of glass having characteristic refractive indices, $n_{D1}$ and $n_{D2}$, and Abbe numbers $v_1$ and $v_2$, falling within the ranges listed in the table below:

| | | | | |
|---|---|---|---|---|
| .207f | ≤ | $R_1$ | ≤ | .217f |
| .425f | ≤ | $R_2$ | ≤ | .445f |
| .198f | ≤ | $R_3$ | ≤ | .215f |
| .140f | ≤ | $R_4$ | ≤ | .149f |
| .044f | ≤ | $t_1$ | ≤ | 0.52f |
| .027f | ≤ | $t_2$ | ≤ | .031f |
| .0004f | ≤ | $S_1$ | ≤ | .0006f |
| .090f | ≤ | $S_2$ | ≤ | .096f |
| 1.615 | ≤ | $n_{D1}$ | ≤ | 1.625 |
| 1.673 | ≤ | $n_{D2}$ | ≤ | 1.721 |
| 57.8 | ≤ | $v_1$ | ≤ | 62.8 |
| 27.8 | ≤ | $v_2$ | ≤ | 33.0 |

9. The lens of claim 8 having values substantially as listed below:

| | |
|---|---|
| $R_1$ | .217f |
| $R_2$ | .435f |
| $R_3$ | .207f |
| $R_4$ | .147f |
| $t_1$ | .048f |
| $t_2$ | .030f |
| $S_1$ | .0004f |
| $S_2$ | .095f |

| | |
|---|---|
| $n_{D1}$ | 1.620 |
| $n_{D2}$ | 1.720 |
| $\nu_1$ | 60.3 |
| $\nu_2$ | 29.3 |

10. The lens of claim 8 having values substantially as listed below:

| | |
|---|---|
| $R_1$ | .217f |
| $R_2$ | .439f |
| $R_3$ | .213f |
| $R_4$ | .148f |
| $t_1$ | .051f |
| $t_2$ | .028f |
| $S_1$ | .0004f |
| $S_2$ | .093f |
| $n_{D1}$ | 1.620 |
| $n_{D2}$ | 1.673 |
| $\nu_1$ | 60.3 |
| $\nu_2$ | 32.2 |

11. The lens of claim 8 having values substantially as listed below:

| | |
|---|---|
| $R_1$ | .208f |
| $R_2$ | .416f |
| $R_3$ | .203f |
| $R_4$ | .143f |
| $t_1$ | 0.45f |
| $t_2$ | .028f |
| $S_1$ | .0005f |
| $S_2$ | .093f |
| $n_{D1}$ | 1.620 |
| $n_{D2}$ | 1.720 |
| $\nu_1$ | 60.3 |
| $\nu_2$ | 29.3 |

12. The lens of claim 8 having values substantially as listed below:

| | |
|---|---|
| $R_1$ | .211f |
| $R_2$ | .424f |
| $R_3$ | .204f |
| $R_4$ | .143f |
| $t_1$ | .046f |
| $t_2$ | 0.29f |
| $S_1$ | .0005f |
| $S_2$ | 0.92f |
| $n_{D1}$ | 1.620 |
| $n_{D2}$ | 1.720 |
| $\nu_1$ | 60.3 |
| $\nu_2$ | 29.3 |

13. The lens of claim 8 having values substantially as listed below:

| | |
|---|---|
| $R_1$ | .211f |
| $R_2$ | .424f |
| $R_3$ | .203f |
| $R_4$ | .143f |
| $t_1$ | .045f |
| $t_2$ | .029f |
| $S_1$ | .0005f |
| $S_2$ | .093f |
| $n_{D1}$ | 1.620 |
| $n_{D2}$ | 1.720 |
| $\nu_1$ | 60.3 |
| $\nu_2$ | 29.3 |

14. The lens of claim 8 having values substantially as listed below:

| | |
|---|---|
| $R_1$ | .211f |
| $R_2$ | .424f |
| $R_3$ | .204f |
| $R_4$ | .143f |
| $t_1$ | .046f |
| $t_2$ | .029f |
| $S_1$ | .0005f |
| $S_2$ | .093f |
| $n_{D1}$ | 1.620 |
| $n_{D2}$ | 1.720 |
| $\nu_1$ | 60.3 |
| $\nu_2$ | 29.3 |

15. A symmetrical lens having four singlet meniscus elements symmetrical about and concave toward a central stop, the first and second elements having radii, proceeding toward the center, $R_1$, $R_2$, $R_3$ and $R_4$, and thicknesses, proceeding toward said center, $t_1$ and $t_2$, said lenses being spaced apart by a space $S_1$ and said second lens being spaced from said center by a space $S_2$, said radii, thicknesses, and spaces being expressed as a fraction of the focal length $f$ falling within the ranges listed below and said elements being of glass having characteristic refractive indices $n_{D1}$ and $n_{D2}$ and Abbe numbers $\nu_1$ and $\nu_2$ falling within the ranges listed in the table below:

| | | | | |
|---|---|---|---|---|
| .028f | ≤ | $R_1$ | ≤ | .217f |
| .416f | ≤ | $R_2$ | ≤ | .439f |
| .203f | ≤ | $R_3$ | ≤ | .213f |
| .143f | ≤ | $R_4$ | ≤ | .148f |
| 0.45f | ≤ | $t_1$ | ≤ | .051f |
| 0.28f | ≤ | $t_2$ | ≤ | .030f |
| .0004f | ≤ | $S_1$ | ≤ | .0005f |
| .092f | ≤ | $S_2$ | ≤ | .095f |
| 1.620 | ≈ | $n_{D1}$ | | |
| 1.673 | ≤ | $n_{D2}$ | ≤ | 1.720 |
| 60.3 | ≈ | $\nu_1$ | | |
| 29.3 | ≤ | $\nu_2$ | ≤ | 32.2 |

16. A retroreflective lens for use at or near unit magnification having first and second singlet meniscus elements and a plano mirror, said elements being concave toward said mirror and having radii, proceeding toward said mirror, $R_1$, $R_2$, $R_3$, and $R_4$, and thicknesses, proceeding toward said mirror, $t_1$ and $t_2$, said first element being separated from said second element by a space $S_1$, and said second element being separated from said mirror by a space $S_2$, said radii, thicknesses and spaces being expressed as a fraction of the focal length $f$, falling within the ranges listed below, and said elements being of glass having characteristic refractive indices, $n_{D1}$ and $n_{D2}$, and Abbe numbers $\nu_1$ and $\nu_2$, falling within the ranges listed in the table below.

| | | | | |
|---|---|---|---|---|
| .208f | ≤ | $R_1$ | ≤ | .217f |
| .416f | ≤ | $R_2$ | ≤ | .439f |
| .203f | ≤ | $R_3$ | ≤ | .213f |
| .143f | ≤ | $R_4$ | ≤ | .148f |
| .045f | ≤ | $t_1$ | ≤ | .051f |
| .028f | ≤ | $t_2$ | ≤ | .030f |
| .0004f | ≤ | $S_1$ | ≤ | .0005f |
| .092f | ≤ | $S_2$ | ≤ | .095f |
| 1.620 | ≈ | $n_{D1}$ | | |
| 1.673 | ≤ | $n_{D2}$ | ≤ | 1.720 |
| 60.3 | ≈ | $\nu_1$ | | |
| 29.3 | ≤ | $\nu_2$ | ≤ | 32.2 |

* * * * *